(12) United States Patent
Parks, Jr.

(10) Patent No.: US 10,077,844 B2
(45) Date of Patent: Sep. 18, 2018

(54) GATE VALVE AND SEAT INSERT FOR A GATE VALVE

(71) Applicant: CACTUS WELLHEAD, LLC, Houston, TX (US)

(72) Inventor: Glenn C. Parks, Jr., Cypress, TX (US)

(73) Assignee: Cactus Wellhead, LLC, Houston, TX (US)

( * ) Notice: Subject to any disclaimer, the term of this patent is extended or adjusted under 35 U.S.C. 154(b) by 0 days.

(21) Appl. No.: 15/605,516

(22) Filed: May 25, 2017

(65) Prior Publication Data
US 2017/0370479 A1 Dec. 28, 2017

Related U.S. Application Data

(60) Provisional application No. 62/355,010, filed on Jun. 27, 2016.

(51) Int. Cl.
| | |
|---|---|
| *F16K 3/02* | (2006.01) |
| *F16K 27/04* | (2006.01) |
| *F16K 3/30* | (2006.01) |

(52) U.S. Cl.
CPC .............. *F16K 3/0227* (2013.01); *F16K 3/30* (2013.01); *F16K 27/044* (2013.01)

(58) Field of Classification Search
CPC .......... F16K 3/12; F16K 31/60; F16K 3/0227; F16K 3/0236; F16K 3/30; F16K 27/044
USPC .................................. 251/326–329, 360–363
See application file for complete search history.

(56) References Cited

U.S. PATENT DOCUMENTS

| | | | | | |
|---|---|---|---|---|---|
| 3,765,647 | A | * | 10/1973 | Grove | F16K 3/0227 251/317 |
| 3,889,925 | A | * | 6/1975 | Brooks | F16K 3/316 251/327 |
| 4,062,516 | A | * | 12/1977 | Grove | F16K 3/0227 251/327 |
| 4,629,161 | A | * | 12/1986 | Jones | F16K 3/186 251/327 |
| 4,645,179 | A | * | 2/1987 | Ali | F16K 3/0227 251/328 |
| 4,776,564 | A | * | 10/1988 | Westenberg | F16K 27/044 251/327 |
| 4,878,651 | A | * | 11/1989 | Meyer, Jr. | F16K 3/0236 251/328 |
| 5,201,872 | A | * | 4/1993 | Dyer | F16K 3/0236 251/328 |
| 7,562,859 | B2 | * | 7/2009 | Lam | F16K 3/0227 251/190 |
| 8,973,897 | B2 | * | 3/2015 | Cordova | F16K 3/30 251/327 |
| 2006/0049374 | A1 | * | 3/2006 | Ehrne | F16K 3/0227 251/327 |

(Continued)

*Primary Examiner* — John Bastianelli
(74) *Attorney, Agent, or Firm* — Greenberg Traurig LLP

(57) ABSTRACT

A gate valve and a seat insert for a gate valve having a valve body, which may be used for hydrocarbon well fracturing operations with a fracturing fluid, or "frac fluid", includes a seat pocket for receipt of the seat insert and a seat, which seat insert may include a tubular member having a first and a second seat insert end face, the first and second seat insert end faces each include at least one annular seal, and the seat insert is disposed in the seat pocket with the first seat insert end face sealed against the valve body and the second seat insert end face sealed against the seat.

4 Claims, 4 Drawing Sheets

(56) References Cited

U.S. PATENT DOCUMENTS

2010/0065769 A1\* 3/2010 Wehr .................... F16K 3/0227
                                                            251/326

\* cited by examiner

GATE VALVE AND SEAT INSERT FOR A GATE VALVE

RELATED APPLICATION

This application claims the benefit, and priority benefit, of U.S. patent application Ser. No. 62/355,010, filed Jun. 27, 2016, entitled "Gate Valve and Seat Insert for a Gate Valve".

BACKGROUND OF THE INVENTION

Field of the Disclosure

This disclosure relates generally to the field of gate valves, and in particular to gate valves for use in fracturing operations conducted in connection with wells for the production of hydrocarbons.

Description of the Related Art

In oilfield production operations, some wells may be stimulated to increase the production of hydrocarbons, such as oil and gas. Such techniques may include high-pressure, or hydraulic, fracturing of the well formation, known to the art as "fracing" a well formation. Generally, in this process a sand-bearing slurry or fracturing fluid, or "frac fluid", is pumped down into the formation surrounding the wellbore at very high pressure. The sand particles of the frac fluid become embedded in small cracks and fissures in the formation, wedging them open and, thus, increasing the flow of produced fluid. Typically, the fluids used during fracturing are often very abrasive. Gate valves may be used in connection with the wellhead during fracturing operations, through which pass the sand-bearing slurry, or frac fluid, as well as other debris generated in connection with the fracturing operations.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one exemplary embodiment, a gate valve for a fluid may include: a valve body having an internal valve cavity; first and second flow passageways extending through the valve body, each flow passageway having a longitudinal axis; a gate member disposed within the valve body and having an opening which may be moved into a fluid transmitting relationship with the first and second flow passageways; an annular recess in the valve body and disposed adjacent and around the first flow passageway, the annular recess having a first wall surface disposed substantially perpendicular to the longitudinal axis of the first flow passageway and a second wall surface disposed substantially parallel to the longitudinal axis of the first flow passageway; the annular recess forming a seat pocket for receipt of a seat and a seat insert; the seat is disposed between the gate member and the first flow passageway, the seat being an elongate tubular member and having first and second ends and an inner and an outer wall surface extending between the first and second ends, the first end of the seat is disposed in a spaced relationship from the first flow passageway and the second end of the seat is disposed adjacent the gate member, the first end of the elongate tubular member having a seat end face; the seat insert is disposed between the seat and the first flow passageway, the seat insert being a tubular member and having first and second ends and an inner and an outer wall surface extending between the first and second ends of the seat insert, the first end of the seat insert is disposed adjacent the first flow passageway and the second end of the seat insert is disposed adjacent the seat end face of the seat; and the first end of the seat insert has a first seat insert end face; and the second end of the seat insert has a second seat insert end face.

In another exemplary embodiment, a seat insert for a gate valve having a gate member, a gate valve body having an internal valve cavity, first and second flow passageways extending through the valve body, and a seat pocket in the valve body for receipt of a seat and the seat insert, may include: a tubular member having first and second ends and an inner and an outer wall surface extending between the first and second ends, the first end of the seat insert adapted to be disposed adjacent the first flow passageway and the second end of the seat insert adapted to be disposed adjacent the seat; the first end of the tubular member having a first seat insert end face, and the second end of the tubular member has a second seat insert end face; and; wherein the first seat insert end face includes at least one annular seal and the second seat insert end face includes at least one annular seal, the first seat insert end face adapted to be disposed within the seat pocket and seal against valve body, and the second seat insert end face adapted to seal against the seat.

BRIEF DESCRIPTION OF THE DRAWING

The present gate valve and seat insert for a gate valve may be understood by reference to the following description taken in conjunction with the accompanying drawing, in which.

Figure 1:
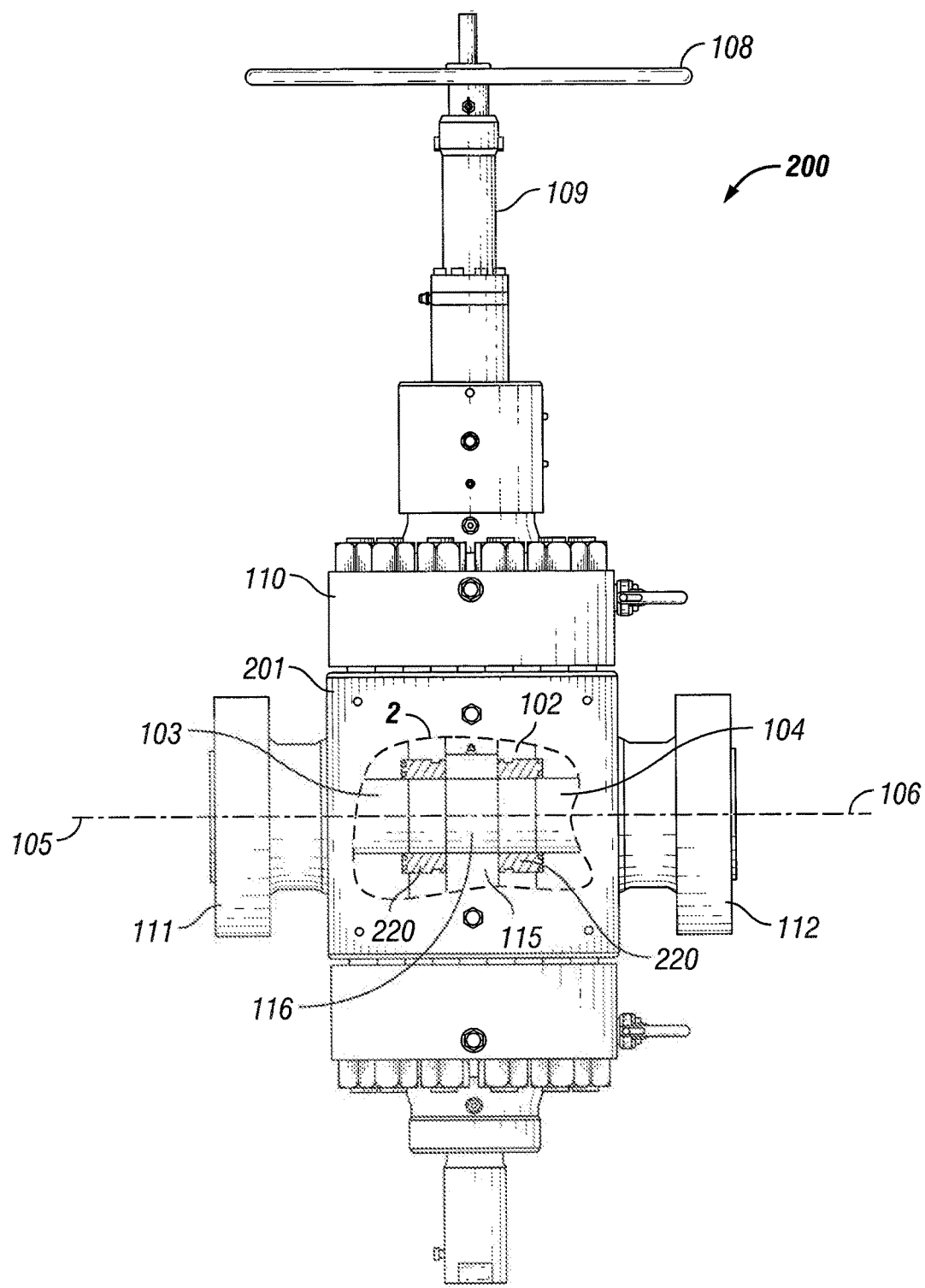
FIG. 1 is a front view of a conventional gate valve, with a cutaway portion A showing a portion of the interior of the gate valve.

While certain embodiments of the present gate valve and seat insert for a gate valve will be described in connection with the present exemplary embodiments shown herein, it will be understood that it is not intended to limit the invention to those embodiments. On the contrary, it is intended to cover all alternatives, modifications, and equivalents, as may be included within the spirit and scope of the invention as defined by the appended claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION OF THE EXEMPLARY EMBODIMENTS

It should be understood that, although an exemplary implementation of one or more exemplary embodiments are provided below, the various specific exemplary embodiments may be implemented using any number of techniques known by persons of ordinary skill in the art. The disclosure should in no way be limited to the exemplary embodiments, drawings, and/or techniques illustrated below, including the exemplary designs and implementations illustrated and described herein. Furthermore, the disclosure may be modified within the scope of the appended claims along with their full scope of equivalents.

Figure 2:
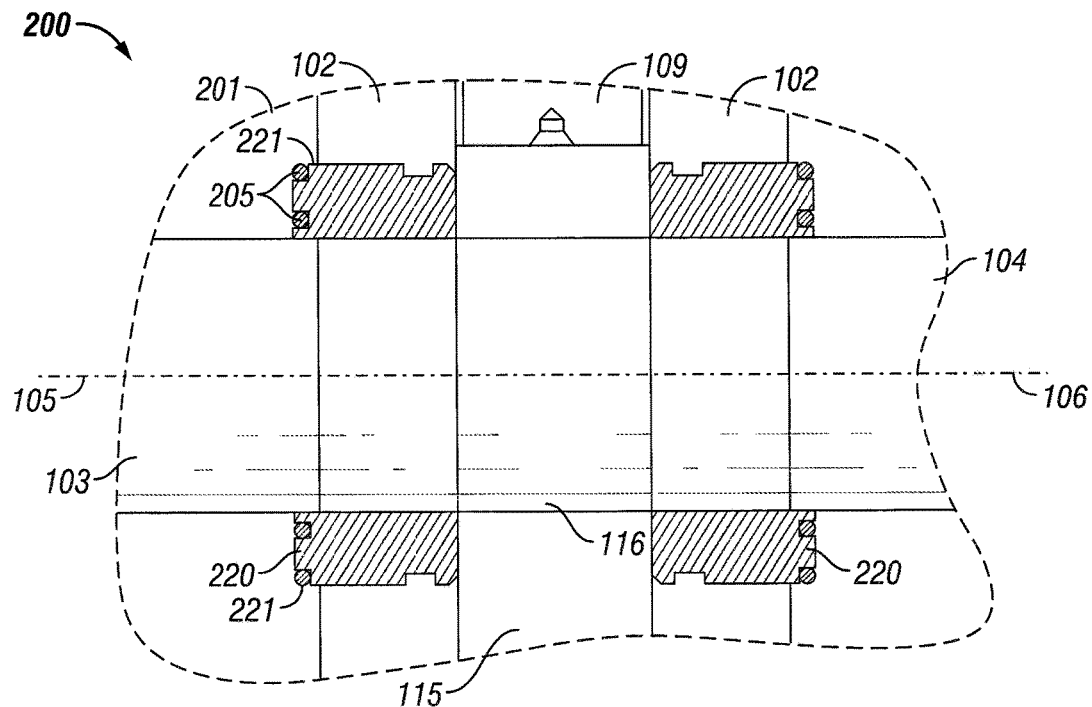
FIG. 2 is an enlarged partial cross-sectional view of the cutaway portion A of the gate valve of FIG. 1.

With reference to FIGS. 1-2, a conventional gate valve 200 is shown to generally include a valve body 201 having an internal valve cavity 102, first and second passageways 103, 104 extending through the valve body 201, with each passageway 103, 104 having a longitudinal axis 105, 106. Preferably, as shown in FIG. 1, the longitudinal axes 105, 106 are coplanar and coincide with each other. As known in the art, gate valve 200 may be provided with a hand wheel 108, or another conventional actuation device, to move a valve stem 109 upwardly or downwardly within valve cavity 102. Gate valve 200 also preferably includes a conventional bonnet 110 that seals about valve stem 109 and seals off valve cavity 102 at the top of valve body 201. Valve 200 may include conventional flanged connectors 111, 112, and sections of pipe (not shown) may be connected to the flanged connectors 111, 112 in a conventional manner. A fluid, such as a sand-bearing slurry or fracturing fluid or "frac fluid", or any other conventional fluid, may be pumped through the gate valve 200 to flow through the valve body 201 and through the first and second passageways, or flow passageways, 103, 104.

Still with reference to FIGS. 1-2, a gate member 115, associated with valve stem 109, is disposed within the valve body 201, and is movable within valve body 201 by movement of valve stem 109 caused by rotating hand wheel 108, or by another actuation device. Gate member 115 has an opening 116, and upon movement of valve stem 109, the opening 116 of gate member 115 may be moved into, and out of, a fluid transmitting relationship with the first and second flow passageways 103, 104, in a conventional manner. Gate valve 200 is shown in its fully open, fluid transmitting relationship, with opening 116 in alignment with the first and second passageways 103, 104. A seat, or valve seat, 220 is disposed in a shallow seat pocket 221 within valve cavity 102 between gate member 115 and each of the passageways 103, 104, whereby when gate member is in its open position, as shown in FIGS. 1-2, fluid may flow through the seats 220, the opening 116 in gate member 115, and through the first and second passageways 103, 104. Gate valve 200 is illustrated as a bi-directional gate valve, in which fluid may flow through gate valve 200 either in a direction from left to right, or right to left as viewed in connection with FIGS. 1-2. If gate valve 200 is used as a bi-directional gate valve, the seats 220 would preferably be of the same construction. Alternatively, if gate valve 200 is only to be utilized for fluid flow in a direction from the left to the right, when viewed in connection with FIGS. 1-2, with the fluid entering the first flow passageway 103 and passing to the right toward the second flow passageway 104, seat 220 adjacent the first flow passageway 103, if desired, could have a different seat construction. As shown in FIG. 2, the seats 220 are of the same construction and design, and include annular face seals 205 which provide sealing between the seats 220 and the valve body 201.

Figure 5:
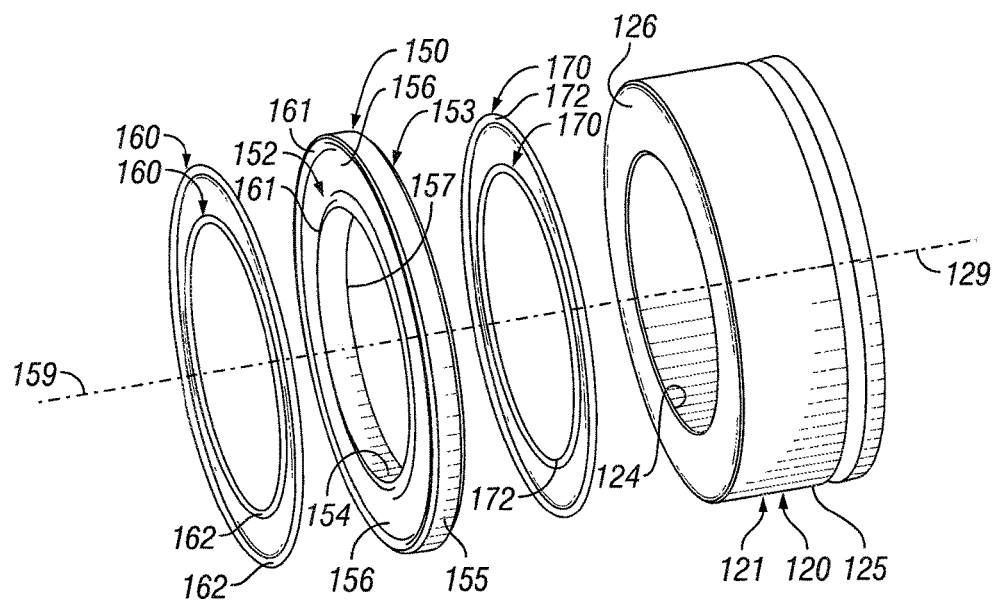
FIG. 5 is an exploded perspective view of an illustrative view of an exemplary embodiment of the seat and seat insert of FIGS. 3 and 4.
Figure 3:
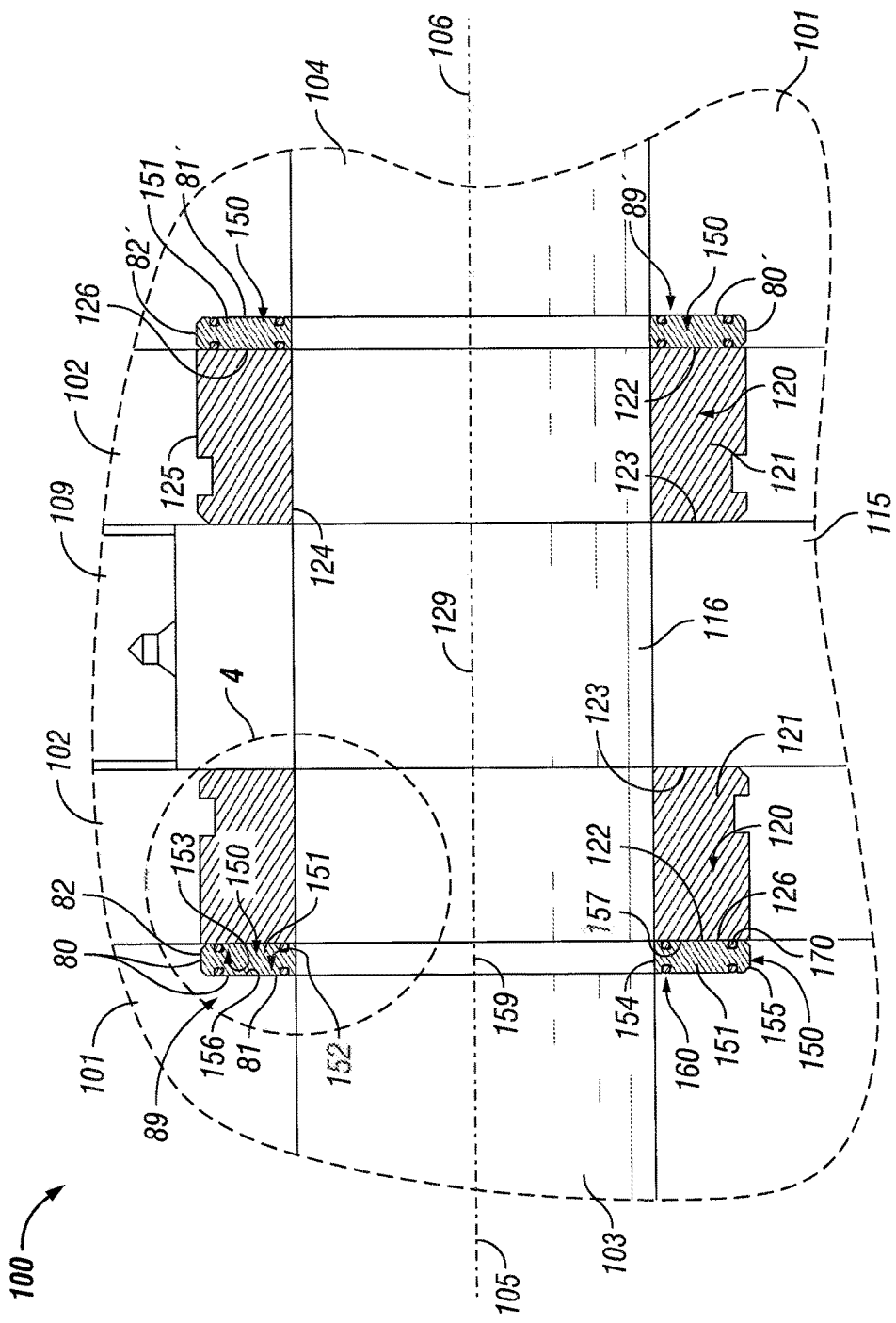
FIG. 3 is an enlarged view of a partial, cross-sectional view of a cutaway portion B of a gate valve in accordance with an exemplary embodiment of the invention, the cutaway portion B being similar to cutaway portion A of FIG. 1.
Figure 4:
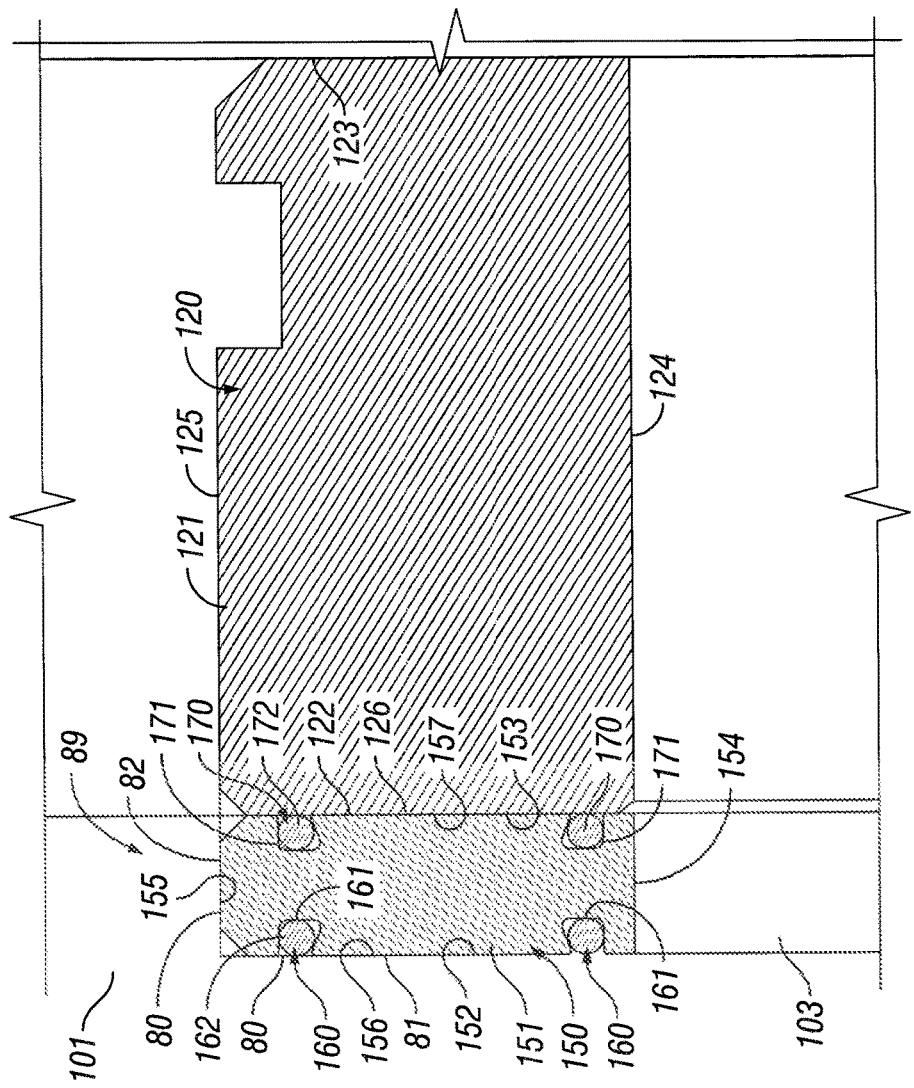
FIG. 4 is an enlarged partial cross-sectional view of the gate valve of FIG. 3 denoted by the dotted circle 4 of FIG. 3.

With reference to FIGS. 3-5, a gate valve 100 in accordance with an illustrative embodiment will be described. Elements having the same structure and function, as those shown and described in connection with FIGS. 1 and 2, have the same reference numerals in FIGS. 3-5. Gate valve 100 is shown to generally include a valve body 101, similar to valve body 201 of FIGS. 1 and 2, and has an internal valve cavity 102, first and second passageways 103, 104 extending through the valve body 101, with each passageway 103, 104 having a longitudinal axis 105, 106. Preferably, as shown in FIG. 3, the longitudinal axes 105, 106 are coplanar and coincide with each other. As known in the art, gate valve 100 may be provided with a hand wheel 108 (FIG. 1), or another conventional actuation device, to move a valve stem 109 upwardly or downwardly within valve cavity 102. Gate valve 100 also preferably includes a conventional bonnet 110 (FIG. 1) that seals about valve stem 109 and seals off valve cavity 102 at the top of valve body 101. Valve 100 may include conventional flanged connectors 111, 112 (FIG. 1), and sections of pipe (not shown) may be connected to the flanged connectors 111, 112 in a conventional manner. A fluid, such as a sand-bearing slurry or fracturing fluid or "frac fluid", or any other conventional fluid, may be pumped through the gate valve 100 to flow through the valve body 101 and through the first and second passageways, or flow passageways, 103, 104.

With reference to FIG. 3, a gate member 115, associated with valve stem 109, is disposed within the valve body 101, and is movable within valve body 101 by movement of valve stem 109 caused by rotating hand wheel 108, or by another actuation device. Gate member 115 has an opening 116, and upon movement of valve stem 109, the opening 116 of gate member 115 may be moved into, and out of, a fluid transmitting relationship with the first and second flow passageways 103, 104. Gate valve 100 is shown in its fully open, fluid transmitting relationship, with opening 116 in alignment with the first and second passageways 103, 104. A seat, or valve seat, 120 is disposed within valve cavity 102 between gate member 115 and a seat insert 150, to be hereinafter described. The seat insert 150 is disposed between the seat 120 and the first flow passageway 103. When gate member is in its open position, as shown in FIG. 3, fluid may flow through the seats 120, the seat inserts 150, the opening 116 in gate member 115, and through the first and second passageways 103, 104. Gate valve 100 is illustrated as a bi-directional gate valve, in which fluid may flow through gate valve 100 either in a direction from left to right, or right to left as viewed in connection with FIG. 3. If gate valve 100 is used as a bi-directional gate valve, the seats 120 and seat inserts 150, would preferably be of the same construction, as will hereinafter be described. Alternatively, if gate valve 100 is only to be utilized for fluid flow in a direction from the left to the right, when viewed in connection with FIG. 3, with the fluid entering the first flow passageway 103 and passing to the right toward the second flow passageway 104, seat 120 and seat insert 150 adjacent the first flow passageway 103, if desired, could have a different construction from that of the present illustrative embodiment to be hereinafter described. As shown in FIG. 3, the seats 120 are of the same construction and design.

With reference to FIGS. 3-4, the seats, or valve seats, 120 will be described in greater detail. Valve body 101 is provided with annular recesses 80, 80' which are disposed adjacent and around the first flow passageway, or first passageway, 103 and the second flow passageway, or second passageway 104. The annular recesses 80, 80' have first wall surfaces 81, 81' disposed substantially perpendicular to the longitudinal axes 105, 106 of the first and second flow passageways 103, 104 and second wall surfaces 82, 82' disposed substantially parallel to the longitudinal axes 105, 106 of the first and second passageways 103, 104. The annular recesses 80, 80' form seat pockets 89, 89' of sufficient depth for receipt of seat inserts 150 and an end portion of seats 120.

As shown in FIGS. 3-5, each seat 120 is preferably an elongate tubular member 121 having a longitudinal axis 129, first and second ends 122, 123, and an inner wall surface 124 and an outer wall surface 125 extending between the first and second ends 122, 123. The first end 122 of elongate tubular member 121 is disposed adjacent the first flow passageway 103 and the second end 123 is disposed adjacent the gate member 115. The first end 122 of the elongate tubular member 121 has a substantially smooth, seat end face 126, which may be provided in a conventional manner as by machining seat end face 126. The longitudinal axis 129 of each elongate tubular member 121 preferably coincides with the longitudinal axis 105 of the first passageway 103 and the longitudinal axis 106 of the second passageway 104. As shown in FIGS. 3 and 4, the seats 120 are disposed in a portion of each seat pocket 89, 89' is in a sealing relationship between the seat end faces 126 and the seat inserts 150 as will be hereinafter described.

With reference to FIGS. 3-5, the seat insert, or inserts 150, will be described in greater detail. Seat inserts 150 are preferably tubular members 151 having a longitudinal axis 159, first and second ends 152, 153, and an inner wall surface 154 and an outer wall surface 155 extending between the first and second ends 152, 153. The longitudinal axis 159 of the tubular members 151 preferably coincides with the longitudinal axis 105 of the first passageway 103, the longitudinal axis 106 of the second passageway 104, and the longitudinal axis 129 of the seats 120. The first end 152 of tubular members 151 are disposed adjacent the flow passageway 103, 104 and the second ends 153 are disposed adjacent the seats 120. The first end 152 of the tubular member 151 has a first seat end face 156 and the second end 153 of the tubular member 151 has a second seat end face 157. As shown in FIGS. 3-5, the first seat insert end face 156 includes at least one annular seal 160 and the second seat insert face 157 includes at least one annular seal 170. Preferably, first seat insert end face 156 includes two annular seals 160, and the second seat insert end face 157 includes two annular seals 170. Annular seals 160, 170 are disposed in annular grooves 161, 171, formed in the seat insert end faces 156, 157 which are concentrically disposed in the first and second seat insert end faces 156, 157. The annular seals 160, 170, and grooves 161, 171 lie in planes which are perpendicular to the longitudinal axis 159 of the seat insert and to the inner and outer wall surfaces 154, 155 of the seat inserts 150. The seat inserts 150 are disposed in the seat pockets 89, 89' with the at least one annular seal 160 in a sealing relationship between the first seat insert end faces 156 and the valve body 101. The at least one annular seal 170 of the second seat insert end faces 157 being in a sealing relationship between the second seat insert end faces 157 and the seats 120, or the seat end faces 160. As shown in FIGS. 3 and 4, preferably a portion of the outer wall surfaces 125 of seats 120 and the outer wall surfaces 155 of seat inserts 150 are disposed adjacent the second wall surfaces 82, 82' of annular recesses 80, 80', which form seat pockets 89, 89'. Seat inserts 150 and seats 120 are slidingly received, or slip fit, within seat pockets 89, 89'.

The annular seals 160, 170 may be of any suitable construction to provide the desired sealing relationship between: the seat insert end faces 156 and the valve body 101, or the first wall surfaces 81, 81' of annular recesses 80, 80'; and the seat insert end faces 157 and seats 120, or seat end faces 126. Preferably, annular seals 160, 170 are O-ring seals 162, 172. Annular seals 160, 170 may be made of any material having the requisite strength and sealing characteristics to function in a gate valve having frac fluid passing therethrough.

Grooves 161, 171 in the seat insert end faces 156, 157 may have any suitable cross-sectional configuration which is capable of receiving the annular seals 160, 170. Preferably, at least some of the grooves 161, 171 have a half-dove tail configuration, which are known as half-dove tail grooves, and preferably all of the grooves 161, 171 here are half-dove tail grooves.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. When numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above, but is defined by the claims that follow, that scope including all equivalents of the subject matter of the claims. Each and every claim is incorporated as further disclosure into the specification and the claims are embodiment(s) of the present disclosure.

While several exemplary embodiments have been provided in the present disclosure, it may be understood that the disclosed embodiments might be embodied in many other specific forms without departing from the spirit or scope of the present disclosure and the appended claims. The present examples are to be considered as illustrative and not restrictive, and the intention is not to be limited to the details given herein. For example, the various elements or components may be combined or integrated in another system or certain features may be omitted, or not implemented.

In addition, the various exemplary embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

I claim:

1. A gate valve for a fluid comprising:
   a valve body having an internal valve cavity;
   first and second flow passageways extending through the valve body, each flow passageway having a longitudinal axis;
   a gate member disposed within the valve body and having an opening which may be moved into a fluid transmitting relationship with the first and second flow passageways;
   an annular recess in the valve body and disposed adjacent and around the first flow passageway, the annular recess having a first wall surface disposed substantially perpendicular to the longitudinal axis of the first flow passageway and a second wall surface disposed substantially parallel to the longitudinal axis of the first flow passageway;
   the annular recess forming a seat pocket for receipt of a seat and a seat insert;
   the seat is disposed between the gate member and the first flow passageway, the seat being an elongate tubular member and having first and second ends and an inner and an outer wall surface extending between the first and second ends, the first end of the seat is disposed in a spaced relationship from the first flow passageway and the second end of the seat is disposed adjacent the gate member, the first end of the elongate tubular member having a seat end face;
   the seat insert is disposed between the seat and the first flow passageway, the seat insert being a tubular member and having first and second ends and an inner and an outer wall surface extending between the first and second ends of the seat insert, the first end of the seat insert is disposed adjacent the first flow passageway and the second end of the seat insert is disposed adjacent the seat end face of the seat;
   the seat has a seat diameter and the seat insert has a seat insert diameter, and the seat diameter and the seat insert diameter are substantially the same;
   the first end of the seat insert has a first seat insert end face; and the second end of the seat insert has a second seat insert end face;
   the first seat insert end face includes at least two annular seals, wherein the at least two annular seals are each disposed within an annular half-dove tail groove in the first seat insert end face;
   the second seat insert end face includes at least two annular seals, wherein the at least two annular seals are each disposed within an annular half-dove tail groove in the second seat insert end face
   the seat insert and the seat are slidingly received within the annular recess in the valve body.

2. The gate valve of claim 1, wherein the at least two annular seals in the first seat insert end face are O-ring seals.

3. The gate valve of claim 1, wherein the at least two annular seals in the second seat insert end face are O-ring seals.

4. The gate valve of claim 1, wherein the seat insert is slidingly received within the annular recess in the valve body.

* * * * *